July 30, 1935. G. D. DODD 2,009,877
CLOSURE FOR PRESSURE VESSELS
Filed March 4, 1931 2 Sheets-Sheet 2
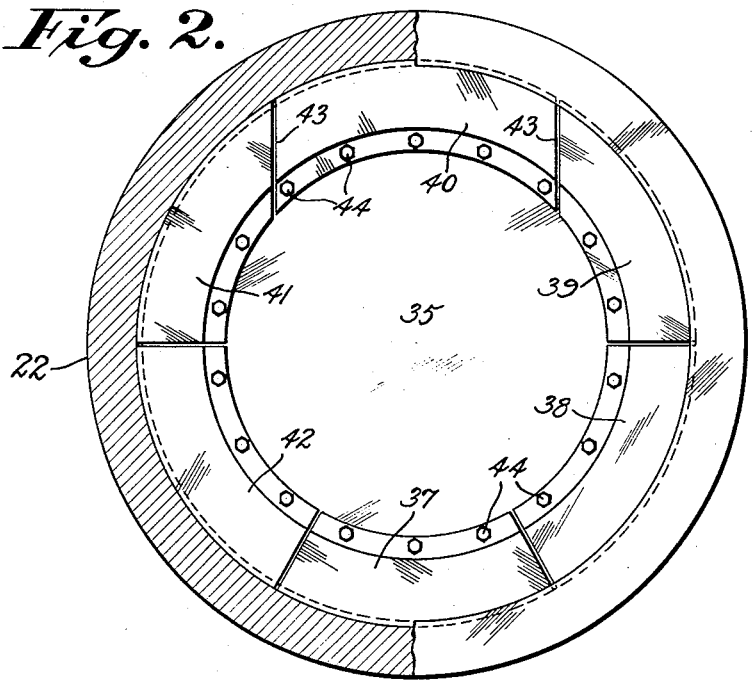
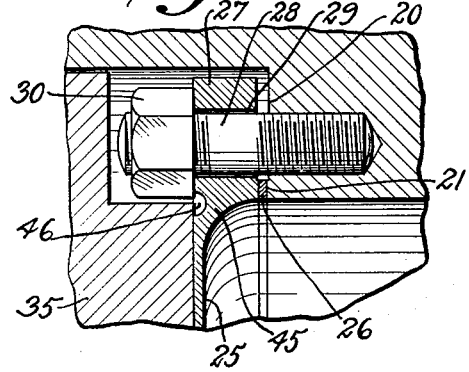
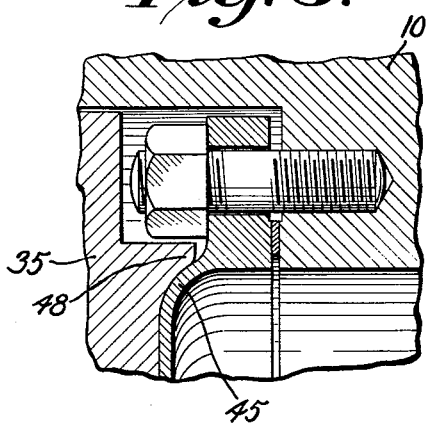
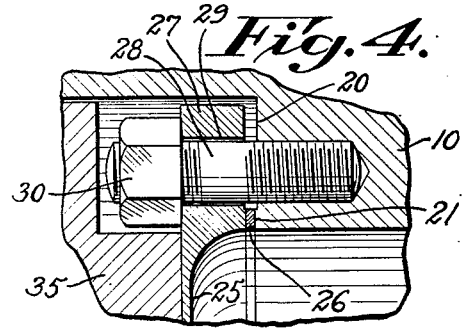
INVENTOR
Gerald Dewey Dodd
BY
William G. McKnight
his ATTORNEY Patented July 30, 1935

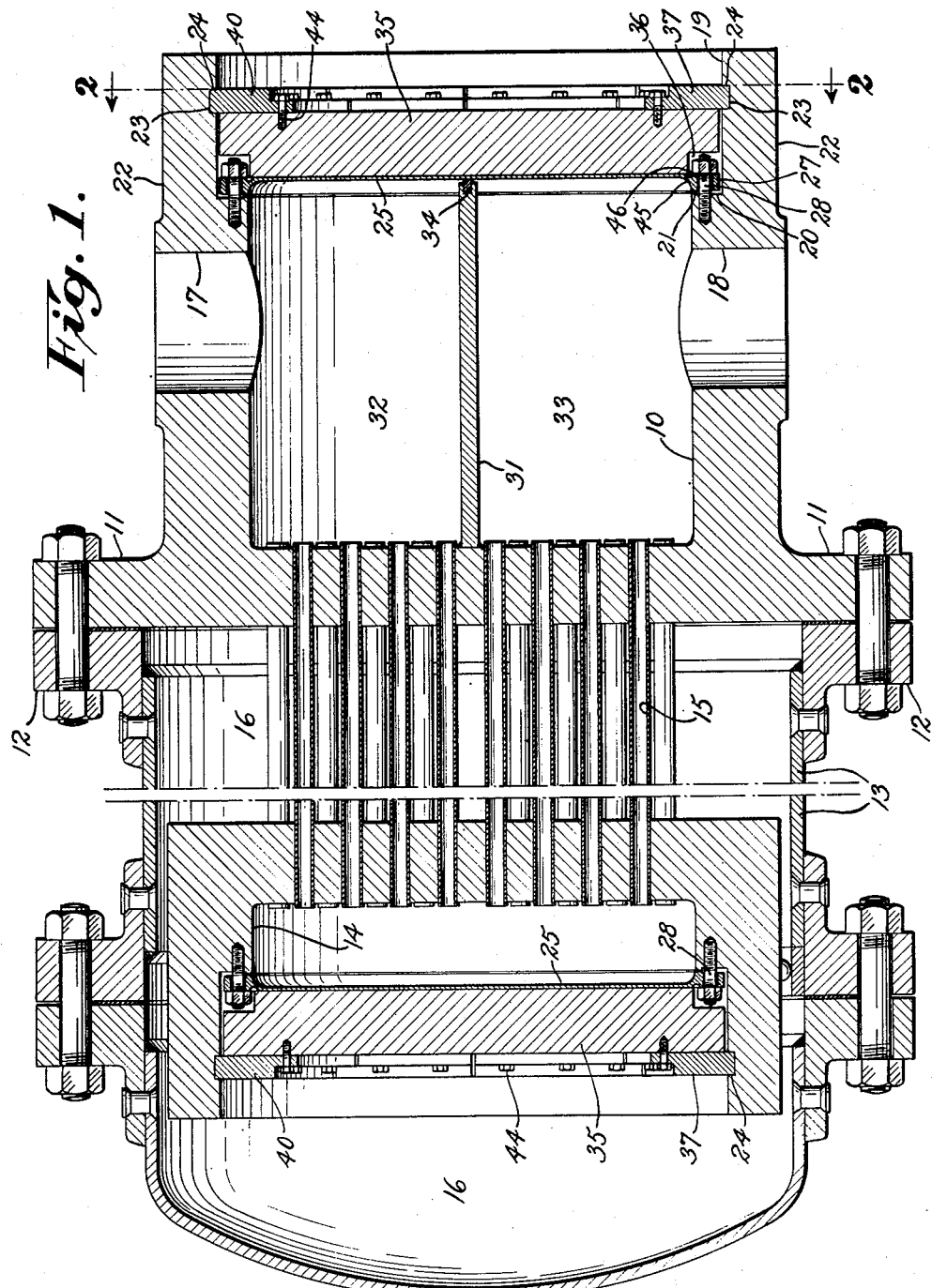

2,009,877

UNITED STATES PATENT OFFICE 2,009,877

CLOSURE FOR PRESSURE VESSELS

Gerald Dewey Dodd, Plainfield, N. J., assignor to Foster Wheeler Corporation, New York, N. Y., a corporation of New York Application March 4, 1931, Serial No. 520,069

24 Claims. (Cl. 220—3)

My invention relates to closures for pressure vessels and more particularly to heads or covers or closure members for heat exchange apparatus operating under what is at the present time considered as high pressure.

With the use of pressures above (say) 1,000 pounds per square inch and up to 15,000 or 18,000 pounds per square inch, as is now coming to be considered a normal rather than an extraordinary pressure, and higher pressures, the problem of securing tightness of covers for the ends of tubular heat exchangers and other pressure vessels has become exceedingly difficult. The general commercial mode of securing covers of this sort is to use a gasket adjacent the edge of a cover plate or head and one or more rows of bolts passing through the cover and squeezing the gasket to the member to which the cover is bolted, such bolts taking all the pressure force. With high pressures it is difficult to provide enough bolts to hold the pressure. The pressure on the bolts is tremendous. This is due to two reasons which involve the fact that the bolts are used for two purposes, namely, first, to take up the total pressure or thrust against the head or cover and, second, to squeeze the gasket sufficiently to prevent leakage. The tension in the bolts necessary for squeezing the gasket may be an appreciable percentage of (or even more than) the tension necessary to take up the total pressure. We may assume that it is 75 per cent.

Assume a pressure vessel operating under a pressure of 12,000 pounds per square inch. Assume that the effective diameter of the head or cover of such a vessel is 36 inches. The area on the cover subjected to pressure is then approximately 1,000 square inches. With a pressure of 12,000 pounds per square inch, the total pressure on the head is approximately twelve million pounds. Assuming that three-quarters of this value is necessary to obtain sufficient squeeze on the gasket to obtain tightness, it will be seen that there is a total tension in the bolts necessary of approximately twenty million pounds. Since all this force must be taken up by the bolts through their threaded surfaces, it will be seen that there is a problem in obtaining a sufficient number of bolts. Mechanical expediences have been devised to obtain a close spacing of bolts. But this involves complications.

The object of my invention is to provide a closure for pressure vessels which obviates the above difficulties with respect to bolting. In accordance with the present invention I have segregated the stresses involving gasket tightness and total pressure, respectively. I carry the total pressure to a bearing shoulder in the main body to be sealed, separately from the gasketing. Furthermore, I limit the gasket pressure, as will hereinafter be described. A preferred form of my novel closure utilizes a flexible diaphragm bearing against a pressure plate which in turn bears against and transmits pressure to a series of shear pieces set into a groove in the main body to be sealed which groove provides the aforesaid bearing shoulder. By this means I am able to use relatively light and ordinary bolts for obtaining gasket tightness and eliminate the difficulties with regard to bolting above described.

My invention will be more readily understood by reference to the accompanying drawings considered in connection with the following description which drawings form a part of this specification and in which I have illustrated a preferred embodiment of the invention with a few modifications as to details, it being understood however, that the principle of the invention may be applied in a number of different structural forms.

With reference to the drawings:

Fig 1 is a longitudinal sectional view of a tubular heat exchanger constructed in accordance with the invention;

Fig. 2 is in part a sectional view taken on the line 2—2 and in part an elevational view; and Figs. 3, 4 and 5 show three different embodiments respectively of a sealing diaphragm constituting part of the apparatus of Fig. 1.

Reference character 10 designates a body member to be sealed which may be a tube header and may be made, for example, of forged steel. Body member 10, in this case, is the principal member of the end box or header of the heat exchanger illustrated. It is flanged at 11 to provide connection to a flange 12 secured to the cylindrical portion 13 of the heat exchanger. It will be understood that the heat exchanger may be a long tubular exchanger but on the drawings I have omitted the entire central portion including inlet and outlet connections to and from the space around the tubes since the present invention is concerned with the closure members at the end of the heat exchanger, and this with respect to the high pressure part; in this case the body member 10, the closure therefor, the return header member 14 and the closure therefor. It will be understood that in the heat exchanger described the high pressure is within the tubes 15 connecting the end boxes or headers while the space around the tubes at 16 is under low pressure. If the pressure were the other way, the closure members would be adapted differently to the structure.

In the cylindrical side wall of body member 10 are inlet and outlet openings 17 and 18. This cylindrical portion is counter-bored at 19 or otherwise manfactured to provide the transverse shelf 20, the inner portion of which may be raised to form the gasket shoulder 21, more clearly shown in Fig. 3. The material of the body member surrounding the space of larger diameter, that is, the material adjacent the surface 19, I will designate as an extension 22 of the body member, though it will be understood that this extension portion is an integral part of the body member. The extension portion 22 is grooved at 23 to provide a thrust shoulder 24. Groove 23 may be termed a thrust groove. Gasket shoulder 21 and thrust shoulder 24 are transverse to the axis of the body member.

A flexible sealing diaphragm 25 is provided adjacent the surfaces 20 and 21. Between this diaphragm and gasket shoulder 21 is placed a gasket 26. The sealing diaphragm is dished over its entire central portion to provide a flexible central portion and leaving a relatively sturdy rim portion 27. Gasket bolts 28 pass through holes 29 in the rim portion 27 and are screwed into the body member 10 adjacent surface 20. By means of the nuts 30 on bolts 28, the rim portion 27 is stressed against the gasket 26 and the gasket clamped between the rim portion and the shoulder 21 of the body member. In most cases I prefer the separate gasket, but in some cases it may be omitted.

A partition 31 is provided for the particular heat exchanger illustrated dividing the interior of the body member 10 into two chambers 32 and 33. Reference character 34 designates a packing strip.

Sealing diaphragm 25, under the pressure in chambers 32 and 33 bears against a pressure plate 35 which is a relatively thick pressure sustaining member and is a cylindrical disc having plane, parallel ends and a groove or a series of recesses 36 formed therein to accommodate the gasket stud bolts and nuts. This plate may be and preferably is made of forged steel.

Outwardly of pressure plate 35 is a series of shear pieces 37, 38, 39, 40, 41 and 42. These shear pieces constitute a thrust assembly. The shear pieces set into the groove 23 are urged against thrust shoulder 24 by the pressure of the pressure plate 35 thereagainst. As is shown in Fig. 2, shear pieces 37, 38, and 42 are of similar shape being segments of the annular thrust assembly with radial edges. Each of the shear pieces 39 and 41 has one radial side, and the other side is such that shear piece 40 may have parallel sides 43. The purpose of this difference in the shear pieces is to permit assembly. Shear piece 40 is inserted last and the parallel sides permit its insertion into groove 23. The shear pieces are held in position by small bolts 44 passing through the reduced inner portions thereof and into pressure plate 35.

The total pressure in chambers 32 and 33 acts against the full inner diameter of the sealing diaphragm 25. However, only a small part of this total pressure is transmitted to the gasket bolts 28 because the central dished flexible portion of the diaphragm backs against pressure plate 35 and substantially the entire total pressure is transmitted to the pressure plate 35. A small percentage of the total pressure is transmitted at the edge of diaphragm member 25 to the rim portion 27 and thus to the gasket bolts 28. At the outer part of the dished portion of the sealing diaphragm is what might be termed a bridge portion 45 where the flexible diaphragm material connects the rim portion with the portion bearing against pressure plate 35. This annular bridge portion is the only part of the sealing diaphragm subjected to the vessel pressure providing tension in the gasket bolts. It is so narrow that the pressure thereon is small and it can stand such pressure for this reason though the material is relatively thin. In order to avoid internal stresses in the diaphragm 25, I may groove the outward side of the diaphragm as at 46. The amount of pressure exerted on the bridge portion 45 is substantially negligible. For this reason the bolts 28 may be small bolts of ordinary steel and nevertheless hold gasket 26 tightly and effect tight sealing. It will be seen that the bolts 28 exert a turning moment on the gasket 26, but this is negligible in effect because the gasket is so close to the bolts and because the rim portion, in distinction to common practice, is not subjected to the twisting effect of the variation of total pressure over the entire closure member.

The greater part and practically all of the total pressure in chambers 32 and 33 is transmitted through the central dished portion of diaphragm 25 to pressure plate 35 and thence to the shear pieces and to thrust shoulder 24. It will be seen that no bolts are used to take up this large pressure. The pressure is carried independently of the gasket sealing means to the shoulder 24 which is formed in the body member. It will readily be seen that this gives the best mode of taking up the reaction force in the body member. Thus the body member itself takes up substantially the entire pressure.

The return header 14 at the opposite end of the heat exchanger may be made up in exactly the same way, wherefore I will not describe it since the construction and action thereof will be obvious from the above description. Like parts are lettered with like reference characters.

Fig. 4 shows the same construction as Fig. 3 except that the diaphragm member 25 is not grooved as at 46. In Fig. 5 is shown another form of construction in which a support for the bridge portion 45 is afforded by an inwardly extending rim 48 on pressure plate 35.

Suitable provision may be made for securing the body member 10 to the body member 14, the present invention not being concerned with the low pressure part of the heat exchanger.

The forms of the invention herein disclosed are to be considered as preferred forms only. Accordingly, it will be understood that the invention is not to be limited except by the scope of the appended claims.

What I claim is:

1. Apparatus of the character described comprising a hollow body member formed with a gasket shoulder and a thrust shoulder, a flexible diaphragm member adjacent said gasket shoulder, said flexible diaphragm member having a relatively thin central portion and a relatively sturdy rim portion, means for urging said rim portion toward said gasket shoulder, a plurality of shear pieces adjacent said thrust shoulder, and a pressure plate between said shear pieces and said flexible diaphragm member for receiving pressure from said diaphragm member and transmitting pressure to said shear pieces.

2. Apparatus of the character described comprising a hollow body member formed with a gasket shoulder and a thrust shoulder, a flexible diaphragm member adjacent said gasket shoulder, said flexible diaphragm member having a relatively thin central portion and a relatively sturdy rim portion, a plurality of bolts for urging said rim portion toward said gasket shoulder, a plurality of shear pieces adjacent said thrust shoulder, and a pressure plate between said shear pieces and said flexible diaphragm member for receiving pressure from said diaphragm member and transmitting pressure to said shear pieces.

3. Apparatus of the character described comprising a hollow body member formed with a gasket shoulder and a thrust shoulder, a flexible diaphragm member adjacent said gasket shoulder, said flexible diaphragm member having a relatively thin central portion and a relatively sturdy rim portion, means for urging said rim portion toward said gasket shoulder, pressure transmitting means adjacent said thrust shoulder and a pressure plate between said pressure transmitting means and said flexible diaphragm.

4. Apparatus of the character described comprising a hollow body member formed with a gasket shoulder and a thrust shoulder, a flexible diaphragm member adjacent said gasket shoulder, said flexible diaphragm member having a relatively thin dished central portion and a relatively sturdy rim portion, means for urging said rim portion toward said gasket shoulder, a plurality of shear pieces adjacent said thrust shoulder and a pressure plate between said shear pieces and said flexible diaphragm member for receiving pressure from the dished portion of said diaphragm member and transmitting pressure to said shear pieces.

5. Apparatus of the character described comprising a hollow body member formed with a gasket shoulder and a thrust shoulder, a flexible diaphragm member adjacent said gasket shoulder, said flexible diaphragm member having a relatively thin central portion and a relatively sturdy rim portion, a gasket between said rim portion and said gasket shoulder, means for clamping said gasket between said rim portion and said gasket shoulder, a plurality of shear pieces adjacent said thrust shoulder and a pressure plate between said shear pieces and said flexible diaphragm member for receiving pressure from said diaphragm member and transmitting pressure to said shear pieces.

6. Apparatus of the character described comprising a hollow body member formed with a gasket shoulder and a thrust groove, a flexible diaphragm member adjacent said gasket shoulder, said flexible diaphragm member having a relatively thin central portion and a relatively sturdy rim portion, means for urging said rim portion toward said gasket shoulder, a plurality of shear pieces in said thrust groove and a pressure plate between said shear pieces and said flexible diaphragm member for receiving pressure from said diaphragm member and transmitting pressure to said shear pieces.

7. Apparatus of the character described comprising a hollow body member formed with a gasket shoulder and a thrust groove, a flexible diaphragm member adjacent said gasket shoulder, said flexible diaphragm member having a relatively thin central portion and a relatively sturdy rim portion, means for urging said rim portion toward said gasket shoulder, a plurality of shear pieces in said thrust groove and a pressure plate between said shear pieces and said flexible diaphragm member for receiving pressure from said diaphragm member and transmitting pressure to said shear pieces, one of said shear pieces having parallel sides.

8. Apparatus of the character described comprising a hollow pressure sustaining body member having an annular sealing surface, a sealing member having a sealing surface, means to secure said sealing member to said hollow member with the sealing surfaces in contact, said sealing member being subjected to pressure in said hollow body member, and means including a pressure plate secured in fixed position to the body member to transmit pressure from substantially the entire area of said sealing member subjected to pressure to said body member independently of said sealing surfaces.

9. Apparatus of the character described comprising a hollow pressure sustaining body member having an annular sealing surface, a sealing member having a sealing surface, means to secure said sealing member to said hollow member with the sealing surfaces in contact, said sealing member being subjected to pressure in said hollow body member, and means comprising a plurality of shear pieces for transmitting pressure from substantially the entire area of said sealing member subjected to pressure to said body member independently of said sealing surfaces.

10. Apparatus of the character described comprising a hollow pressure sustaining body member having an annular sealing surface, a sealing member, means to secure said sealing member adjacent said sealing surface, said sealing member being subjected to pressure in said hollow body member, and means comprising a plurality of shear pieces and a relatively heavy pressure plate for transmitting pressure from substantially the entire area of said sealing member subjected to pressure to said body member independently of the means for securing the sealing member adjacent the sealing surface.

11. Apparatus of the character described comprising a hollow pressure sustaining body member having an annular sealing surface, a sealing member having a relatively sturdy rim portion, a relatively flexible central portion and a bridge portion between the rim portion and the central portion, means to secure said rim portion adjacent said sealing surface, said sealing member being subjected to pressure in said hollow body member, and means to transmit pressure from the central portion of said sealing member to said body member independently of the means for securing the rim portion adjacent the sealing surface.

12. Apparatus of the character described comprising a hollow pressure sustaining body member having an annular sealing surface, a sealing member having a relatively sturdy rim portion, a relatively flexible central portion and an oblique bridge portion between the rim portion and the central portion, means to secure said rim portion adjacent said sealing surface, said sealing member being subjected to pressure in said hollow body member, and means to transmit pressure from the central portion of said sealing member to said body member independently of the means for securing the rim portion adjacent the sealing surface.

13. In a hollow member adapted to hold fluid under pressure and having an opening formed therein and a sealing surface formed adjacent to said opening, closure means having a sealing surface adapted to cooperate with said first-mentioned sealing surface, means for pressing said sealing surfaces together to prevent leakage of fluid therebetween, and means including a pressure plate secured in fixed position to the hollow member for transmitting pressure from said closure means to said hollow member independently of said sealing surfaces.

14. In a hollow member adapted to hold fluid under pressure and having an opening formed therein and a sealing surface formed adjacent to said opening, closure means having a sealing surface adapted to cooperate with said first-mentioned sealing surface, tension means for pressing said sealing surfaces together to prevent leakage of fluid therebetween, and compression means including a pressure plate secured in fixed position to the hollow member for transmitting from said closure means to said hollow member independently of said sealing surfaces a portion of the pressure exerted by the fluid against said closure means.

15. In a hollow member adapted to hold fluid under pressure and having an opening formed therein and a sealing surface formed adjacent to said opening, closure means having a sealing surface adapted to cooperate with said first-mentioned sealing surface, bolts for pressing said sealing surfaces together to prevent leakage of fluid therebetween, and shear pieces for transmitting from said closure means to said hollow member independently of said sealing surfaces the major portion of the pressure exerted by the fluid against said closure means.

16. In a hollow member adapted to hold fluid under pressure and having an opening formed therein and a sealing surface formed adjacent to said opening, closure means having a sealing surface adapted to cooperate with said first-mentioned sealing surface, means for pressing said sealing surfaces together to prevent leakage of fluid therebetween, shear pieces abutting against said hollow member, and a pressure plate between said shear pieces and said closure means for transmitting from said closure means to said shear pieces independently of said sealing surfaces the major portion of the pressure exerted by the fluid against said closure means.

17. In a hollow member adapted to hold fluid under pressure and having an opening formed therein and a sealing surface formed adjacent to said opening, flexible closure means having a sealing surface adapted to cooperate with said first-mentioned sealing surface, means for pressing said sealing surfaces together to prevent leakage of fluid therebetween and means including a pressure plate secured in fixed position to the body member for supporting said flexible closure means independently of said sealing surfaces against the major portion of the pressure exerted thereon by the fluid.

18. In a hollow member adapted to hold fluid under pressure and having an opening formed therein and a sealing surface formed adjacent to said opening, a closure member having a flexible central portion and a reenforced rim, said rim having a sealing surface, means for pressing said sealing surfaces together to prevent leakage of fluid therebetween, and means for supporting the flexible portion of said closure member independently of said sealing surfaces against the major portion of the pressure exerted thereon by the fluid.

19. In a hollow member adapted to hold fluid under pressure and having an opening formed therein and a sealing surface formed adjacent to said opening, flexible closure means having a sealing surface adapted to cooperate with said first-mentioned sealing surfaces, bolts for pressing said sealing surfaces together to prevent leakage of fluid therebetween, shear pieces abutting against said hollow member, and a pressure plate between said shear pieces and said flexible closure means for supporting said flexible closure means independently of said sealing surfaces against a substantial portion of the pressure exerted thereon by the fluid.

20. In a hollow member adapted to hold fluid under pressure and having an opening formed therein and a sealing surface formed adjacent to said opening, a closure member having a flexible central portion and a reenforced rim, said rim having a sealing surface, bolts for pressing said sealing surfaces together to prevent leakage of fluid therebetween, shear pieces abutting against said hollow member, and a pressure plate between said shear pieces and the flexible portion of said closure member for supporting said flexible portion against a substantial portion of the pressure exerted thereon by the fluid and for transmitting said portion of pressure independently of said sealing surfaces to said shear pieces.

21. In a hollow member adapted to hold fluid under pressure and having an opening formed therein and a sealing surface formed adjacent to said opening, a closure member having a sealing surface, a gasket between said sealing surfaces, means for pressing said closure member against said gasket to prevent leakage of fluid, and means including a pressure plate secured in fixed position to the body member for transmitting from said closure member to said hollow member independently of said gasket a substantial portion of the pressure exerted by the fluid against said closure member.

22. In a hollow member adapted to hold fluid under pressure and having an opening formed therein and a sealing surface formed adjacent to said opening, a flexible closure member having a sealing surface, a gasket between said sealing surfaces, means for pressing said closure member against said gasket to prevent leakage of fluid, and means including a pressure plate secured in fixed position to the body member for supporting said flexible closure member independently of said gasket against a substantial portion of the pressure exerted thereon by the fluid.

23. In a hollow member adapted to hold fluid under pressure and having an opening formed therein and a sealing surface formed adjacent to said opening, a closure member having a flexible central portion and a reenforced rim, said rim having a sealing surface, a gasket between said sealing surfaces, means for pressing said rim against said gasket to prevent leakage of fluid, and means for supporting the flexible portion of said closure member independently of said gasket against a substantial portion of the pressure exerted thereon by the fluid.

24. In a hollow member adapted to hold fluid under pressure and having an opening and a sealing surface, means having a sealing surface adapted to cooperate with said first mentioned sealing surface, means for forcing said sealing surfaces into cooperative relation to prevent leakage of fluid therebetween, a closure for the opening, and means including a pressure plate secured in fixed position to the body member for transmitting pressure exerted by the fluid in the hollow member from said first mentioned means to said hollow member independently of said sealing surfaces.

GERALD DEWEY DODD.